United States Patent
Imanishi

(10) Patent No.: US 10,146,497 B2
(45) Date of Patent: Dec. 4, 2018

(54) MULTILAYER IMAGE DISPLAY DEVICE

(71) Applicant: ALPINE ELECTRONICS, INC., Shinagawa-ku, Tokyo (JP)

(72) Inventor: Shunichi Imanishi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/467,552

(22) Filed: Mar. 23, 2017

(65) Prior Publication Data

US 2017/0337024 A1    Nov. 23, 2017

(30) Foreign Application Priority Data

May 18, 2016 (JP) ................................ 2016-099424

(51) Int. Cl.
| | |
|---|---|
| G09G 3/36 | (2006.01) |
| G06F 3/147 | (2006.01) |
| H04N 9/31 | (2006.01) |
| B60K 35/00 | (2006.01) |
| G02F 1/13357 | (2006.01) |

(52) U.S. Cl.
CPC .............. *G06F 3/147* (2013.01); *B60K 35/00* (2013.01); *G09G 3/36* (2013.01); *H04N 9/315* (2013.01); *H04N 9/317* (2013.01); *B60K 2350/2039* (2013.01); *B60K 2350/2052* (2013.01); *B60K 2350/2082* (2013.01); *G02F 1/1336* (2013.01)

(58) Field of Classification Search
CPC .... B60K 2350/2039; B60K 2350/2052; B60K 2350/2082; B60K 35/00; G02F 1/1336; G06F 3/147; G09G 3/36; G09G 3/001; G09G 3/002; H04N 9/315; H04N 9/317
See application file for complete search history.

(56) References Cited

U.S. PATENT DOCUMENTS

| | | | | |
|---|---|---|---|---|
| 5,782,547 A | * | 7/1998 | Machtig | G02B 27/2292 348/E13.042 |
| 6,037,914 A | * | 3/2000 | Robinson | G02B 27/0101 345/7 |
| 6,042,235 A | * | 3/2000 | Machtig | G02B 27/2292 348/14.16 |
| 6,257,727 B1 | * | 7/2001 | Melville | G02B 27/01 353/28 |

(Continued)

FOREIGN PATENT DOCUMENTS

JP    2004-361467    12/2004

*Primary Examiner* — Kenneth Bukowski
(74) *Attorney, Agent, or Firm* — Brinks Gilson & Lione

(57) ABSTRACT

A two-layer image display device includes a back side LCD, a transparent screen, and a lower side LCD. The back side LCD displays an image on a display screen. The transparent screen is disposed on a front side of the display screen of an image display device. The lower side LCD projects an image from a lower position of the transparent screen. The transparent screen reflects, with directivity, light incident at a predetermined angle and includes an anisotropic optical film which transmits light incident at an angle other than the predetermined incident angle. The lower side LCD is disposed at a position where the image incident at the predetermined angle is projected and reflected on the transparent screen. The back side LCD is disposed at a position where incident light from an image displayed on the display screen transmits through the transparent screen.

6 Claims, 4 Drawing Sheets

(56) References Cited

U.S. PATENT DOCUMENTS

| | | | | |
|---|---|---|---|---|
| 6,317,251 | B1* | 11/2001 | Wang | G02F 1/292 |
| | | | | 359/315 |
| 6,580,562 | B2* | 6/2003 | Aoki | G02B 27/0101 |
| | | | | 345/7 |
| 7,602,352 | B2* | 10/2009 | Kiesewetter | B60K 37/02 |
| | | | | 345/4 |
| 7,872,569 | B2* | 1/2011 | Kiesewetter | B60K 37/02 |
| | | | | 340/461 |
| 8,576,142 | B2* | 11/2013 | Moriya | B60K 35/00 |
| | | | | 340/425.5 |
| 9,678,340 | B2* | 6/2017 | Kanamori | G02B 27/01 |
| 2005/0104801 | A1* | 5/2005 | Sugiura | H01L 27/12 |
| | | | | 345/5 |
| 2008/0218870 | A1* | 9/2008 | Lind | G02B 17/0621 |
| | | | | 359/630 |
| 2009/0160736 | A1* | 6/2009 | Shikita | G02B 27/0101 |
| | | | | 345/7 |
| 2012/0236046 | A1* | 9/2012 | Sugiyama | G02B 27/01 |
| | | | | 345/690 |
| 2013/0082905 | A1* | 4/2013 | Ranieri | H04N 13/0409 |
| | | | | 345/32 |
| 2013/0335534 | A1* | 12/2013 | Hanzawa | H04N 5/23212 |
| | | | | 348/50 |

* cited by examiner

MULTILAYER IMAGE DISPLAY DEVICE

RELATED APPLICATION

The present application claims priority to Japanese Patent Application Number 2016-099424, filed May 18, 2016, the entirety of which is hereby incorporated by reference.

BACKGROUND

1. Field

The present disclosure relates to a multilayer image display device including an image display device, an image projection device, and a transparent screen.

2. Description of the Related Art

Improved image displays with a full graphic-type cluster panel (display) are increasingly used in vehicles. These full graphic-type cluster panels can display dynamic and various information types, as compared to a conventional meter cluster panel. When such dynamic displays are used, a driver may not always require or desire the meter display.

In this case, contents of a meter is fixed to a standard specification and area, and only in an area with a high degree of freedom is a various display considered. However, in such a setting, advantages of a full graphic-type display are not fully utilized. On the other hand, by increasing a size of a cluster panel, a meter having a standard specification may be used, while the other remaining portion may be displayed dynamically or variously. However, it is not useful to unnecessarily increase setting environments (e.g., the size) of a cluster panel from original setting environments where "a visor for external light reflection is needed", and "a steering wheel is provided on a front side".

In this case, a two-layer image display is used in a cluster panel, and in consideration of the above setting environments, a standard specification may be used without lowering a degree of freedom of a various or dynamic display. This two-layer configuration may be realized if a transparent display (for example a transparent OLED) is disposed on a front side of two displays, i.e., disposed on front and back sides. However, such a display becomes more expensive than an LCD that is currently inexpensively supplied. Therefore, or alternatively, two LCDs and a half mirror may be used to form an inexpensive two-layer image display device (for example, refer to JP 2004-351467 A).

SUMMARY

As illustrated in FIG. 4, which is a schematic view of the two-layer image display device described in JP 2004-351467 A, the image display device needs to have a depth length to dispose a half mirror 102 of a two-layer image display device 101 inclined at 45 degrees. Consequently, a depth length 103 of a visor (not illustrated) is extended, an outer diameter is increased, and a visual field area is narrowed. In addition, a visual image recognition range is limited since a vertical image 105 is realized by reflection by the half mirror 102. Therefore, it is necessary to largely design the half mirror 102 in accordance with a head-movable range of a driver 106. Further, a transmittance of the half mirror 102 is approximately 50%. Therefore, to increase visibility for the driver 106, it is necessary to increase the luminance of a backlight of a back side LCD 107. Furthermore, it is necessary to suppress reflected right in a direction other than a specific direction (e.g. toward the driver), for example, reflected light around a lower side LCD 108.

In this manner, the half mirror 102 two-layer method has many restrictions, including for example, difficulty in down-sizing the display device. Incidentally, a transparent display (e.g., a transparent OLED) is originally not highly transparent, and AR coating for suppressing external light reflection needs to be performed on its surface. Therefore, keeping a high transmittance is not easy. Furthermore, wiring makes display impossible at least on three sides.

An object of the present disclosure is to provide a multilayer image display device capable of down-sizing and improved visibility.

In that regard, a multilayer image display device according to the present disclosure includes an image display device, a transparent screen, and an image projection device. The image display device displays an image on a display screen. The transparent screen is disposed on a front side of the display screen of the image display device. The image projection device projects an image from a lower position of the transparent screen. The transparent screen reflects light incident at a predetermined angle with directivity and includes an anisotropic optical film which transmits light incident at an angle other than the predetermined incident angle. The image projection device is disposed at a position where the image incident at the predetermined angle is projected and reflected on the transparent screen. The image display device is disposed at a position where incident light from an image displayed on the display screen transmits through the transparent screen.

According to the this configuration, instead of a conventional inclined disposed half mirror, multilayer image display is performed by superimposing a real image including i) an image projected by an image projection device on ii) an image which is displayed on the image display device and transmits through a transparent screen. The transparent screen includes an anisotropic optical film which reflects light incident at a predetermined angle with directivity, and transmits light incident at an angle other than the predetermined incident angle. Therefore, a depth size of the device can be reduced, and it is not necessary to increase a luminance of the image of the image display device, which transmits through the transparent screen. Further, a real image can be visually recognized, and therefore a multilayer image display device having high visibility can be provided.

In the multilayer image display device according to the present disclosure, the image projection device includes an angle adjustment mechanism which can adjust an angle incident to the transparent screen, i.e., to the predetermined angle.

According to the this configuration, a transparent screen including an anisotropic optical film reflects, with directivity, light incident at a predetermined angle. Therefore, multilayer display can be performed by adjusting the incident light from an image projection device to the predetermined angle and superimposing a projection image on a display image from an image display device positioned on a back side of the transparent screen with respect to a viewer positioned on a front side of the transparent screen. A screw-type mechanical adjustment mechanism, for example, may be a suitable angle adjustment mechanism.

In the multilayer image display device according to the present disclosure, a light source of the image projection device is a specific direction converging light source, which converges light in a specific direction.

According to this configuration, a totally reflected luminous flux in a projection image by an image projection display device on a transparent screen may be limited such that a luminance of the reflected image may be insufficient.

However, the luminous flux depends on a specific direction converging light source, which can be compensated by increasing a light flux in a specific direction (i.e., predetermined angle) from the image projection display device to the transparent screen.

In the multilayer image display device according to the present disclosure, the image projection device includes a converging light angle adjustment unit to adjust a converging angle of the specific direction converging light source.

According to the this configuration, the converging angle can be adjusted at an angle with a high converging efficiency, and insufficiency of a luminance of a reflected image can be efficiently solved. A converging light angle adjustment unit, for example, may comprise a mechanical mechanism to move a specific direction converging light source and an optical mechanism (such as lens) to change a converging angle.

In the multilayer image display device according to the present disclosure, the image display device and the image projection device include an LCD panel which displays an image by using a backlight as a light source.

According to the this configuration, which is different from the case where a transparent OLED is used, cost may be suppressed by using an LCD panel.

In the multilayer image display device according to the present disclosure, display screens of the image display device and the image projection device may be AR (anti-reflective) coated screens.

According to the this configuration, reflection of a light incident from outside of the image display device and the image projection device can be suppressed. Therefore, external light influence on a multilayer display image can be suppressed.

According to a multilayer image display device according to the present disclosure, in comparison with a multilayer image display device using a conventional inclined disposed half mirror, the depth of a device body including a visor can be shortened, and the device body can be made compact. Further, in comparison with a virtual method using a half mirror inclined in a conventional multilayer image display device, a transparent film reflection image by an image projection device of the multilayer image display device according to the present disclosure is a real image, and therefore, visibility is not significantly affected in a certain head-movable range of a viewer. In addition, in comparison with a conventional half mirror, light transmittance of a transparent film is high. Therefore, it is not necessary to increase a luminance of an image display device positioned on a back side of the film.

DETAILED DESCRIPTION

Figure 1:
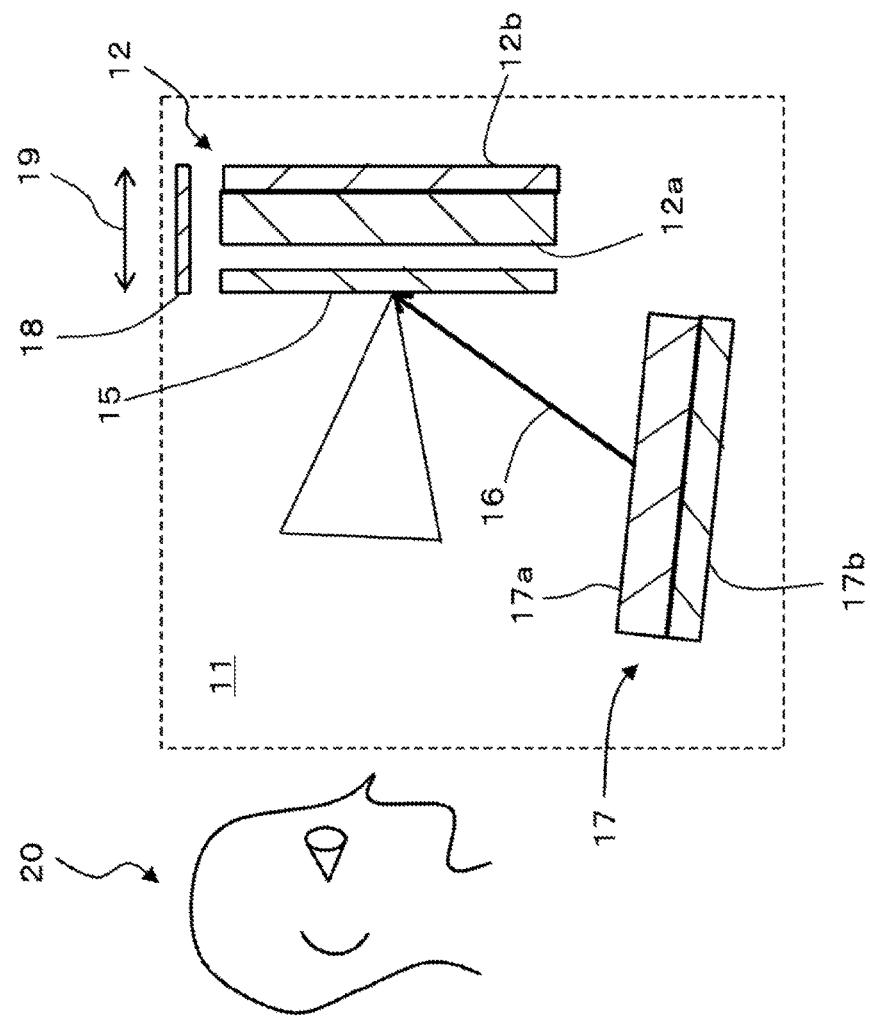
FIG. 1 is an outline explanatory view of a multilayer image display device according to an embodiment of the present disclosure.

An embodiment of the present disclosure will be described with reference to drawings. FIG. 1 is an outline explanatory view of a configuration of a two-layer image display device 11 which is a multilayer image display device according to the embodiment of the present disclosure.

In FIG. 1, the two-layer image display device 11 includes a back side liquid crystal display (LCD) 12, a transparent screen 15, a lower side LCD 17, and a visor 18. The back side LCD 12 is an image display device. The transparent screen 15 includes an anisotropic optical film and is disposed on a front side of a display screen 12a of the back side LCD 12. The lower side LCD 17 is an image projection device and disposed at a position opposite to the back side LCD 12 across from the transparent screen 15, and on a lower side of the transparent screen 15. The visor 18 is disposed on an upper side of the back side LCD 12 and the transparent screen 15, and extends in a depth direction 19 (lateral direction on a paper) to prevent incident rays from outside of the back side LCD 12 and the transparent screen 15. Unnecessary light beam reflection from outside can be suppressed by performing AR coating on a surface of the display screen 12a of the back side LCD 12 and a display screen 17a of the lower side LCD 17. Further, the unnecessary light beam reflection from outside can be suppressed by extending the visor 18 in a depth direction 19 thereof.

A viewer 20 positioned on a front side of the transparent screen 15 of the two-layer image display device 11 can visually recognize a two-layer image on which a display image of the back side LCD 12 is disposed on a back side of the transparent screen 15 and a projection image of a lower side LCD is reflected on the transparent screen 15.

The back side LCD 12 is a liquid crystal display including a display screen 12a on the transparent screen 15 side on a front side, and a backlight 12b on a back surface. When a display image displayed on the display screen 12a transmits through the transparent screen 15, a transmittance (approximately 80%) is higher than a transmittance ratio (approximately 50%) of a conventional half mirror specification. Therefore, a backlight 12b with a normal specification can be used.

The transparent screen 15 includes an anisotropic optical film (refer to JP 2015-222441 A). The anisotropic optical film is characterized in that light incident at a predetermined incident angle (for example, incident light from a display image of the lower side LCD 17) is totally reflected, and other incident light (for example, incident light from a display image of a back side LCD 12 positioned on a back side) is transmitted. With respect to the transparent screen 15 including such the anisotropic optical film, the back side LCD 12 is disposed on a back side, and the lower side LCD 17 is disposed at a position where incident light can project at a predetermined angle from a front lower position. Consequently, a two-layer image can be realized by forming and displaying a superimposing image by the LCDs 12 and 17 on the transparent screen 15. The lower side LCD 17 includes an angle adjustment mechanism (not illustrated) which can adjust an incident angle to the transparent screen 15, for example, a mechanical adjustment mechanism capable of screw-type adjustment. Therefore, an incident angle can be adjusted to the above-described predetermined angle.

The lower side LCD 17 disposed on a front lower side of the transparent screen 15 includes a display screen 17a on the transparent screen 15 side and a specific direction converging-type backlight 17b on a back surface side. To control reflection light in the backlight 17b, the specific direction converging-type backlight 17b is optimized to irradiate light in a specific direction by precisely machining on a surface of a light guide. As described later, a projection image on the transparent screen 15 by a display image on the display screen 17a of the lower side LCD 17 is visually recognized by the viewer 20 since the image is totally reflected when an incident angle is a predetermined angle. In this regard, a luminance of a reflection image (projection image) becomes insufficient when a normal backlight is used. Therefore, the insufficiency is compensated by using the backlight 17b using a specific direction converging technique (for example, a laser array and a parallel light emission means disclosed in JP 2014-504427 A) and increasing a light flux in a direction from the LCD 17 to the transparent film 15. Preferably, the lower side LCD 17 includes a converging light angle adjustment unit to adjust a converging angle of the backlight 17b using a specific direction converging technique, for example, a mechanical mechanism to move the backlight 17b to a predetermined position and an optical mechanism (such as lens) to change a converging angle.

By characteristics of the transparent screen 15 including the above-described anisotropic optical film, the two-layer image display device 11 causes the viewer 20 to visually recognize a display image of a back side LCD 12 by transmitting the image, and causes the viewer 20 to visually recognize a projection image of the lower side LCD 17 by totally reflecting the image. Consequently, a two-layer image display is realized by the transparent screen 15 using an anisotropic optical film instead of a conventional half mirror method.

Figure 2:
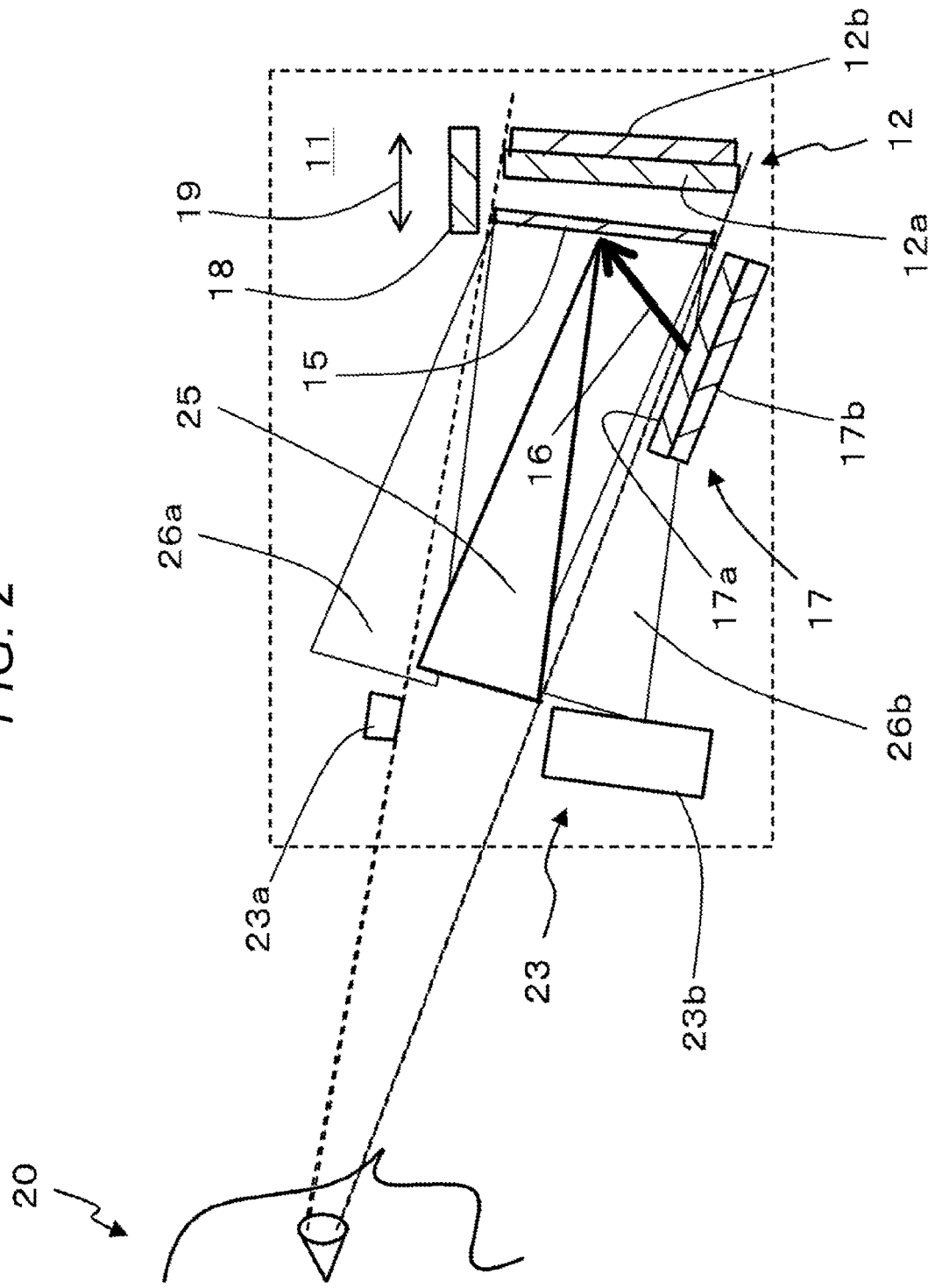
FIG. 2 is an outline explanatory view of the multilayer image display device according to the embodiment of the present disclosure disposed in a vehicle.

Next, the two-layer image display device 11 disposed in a vehicle (not illustrated) will be described with reference to FIG. 2. A configuration of FIG. 2 is same as a configuration of FIG. 1. Therefore, reference signs and names will be described in common.

In FIG. 2, the two-layer image display device 11 is provided in an instrument panel (not illustrated) in which instruments are disposed on the front side of a driver's seat in a vehicle as a cluster panel, and a superimposed image by a two-layer image display is visually recognized by the viewer (driver) 20 through a hollow portion of a steering wheel 23. The hollow portion of the steering wheel 23 is mainly provided between a steering wheel peripheral frame 23a and a steering wheel center 23b. The back side LCD 12, the transparent screen 15, the lower side LCD 17, and the visor 18 are disposed after a position is adjusted so as to be visually recognized through the hollow portion.

The display screen 12a of the back side LCD 12 is desirably disposed at an angle facing a visual line of the viewer 20. However, a head position of the viewer 20 who is a driver may be individually different, and therefore, the display screen 12a is preferably disposed at an inclined position within a certain angle such that a display image of the back side LCD 12 transmits through the transparent screen 15 and is visually recognized by the viewer 20. The display screen 12a of the back side LCD 12 and the transparent screen 15 are disposed in a substantially parallel relation.

Figure 3A:
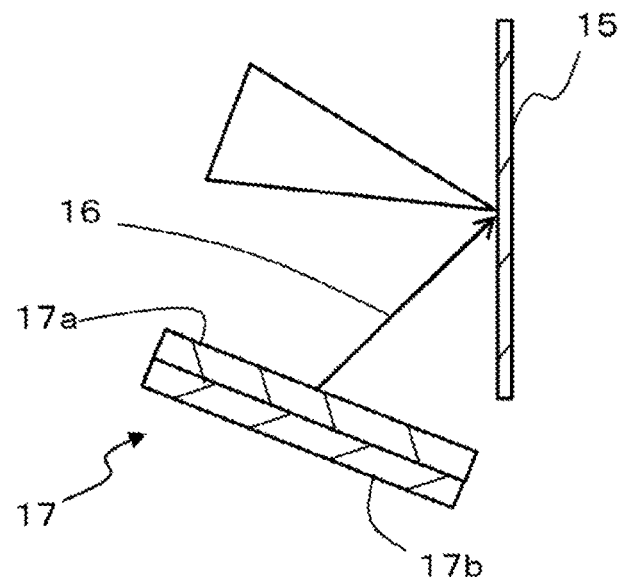
FIG. 3A is a schematic view illustrating the case where a total reflection angle of incident light of a projection image on a transparent film is adjusted.
Figure 3B:
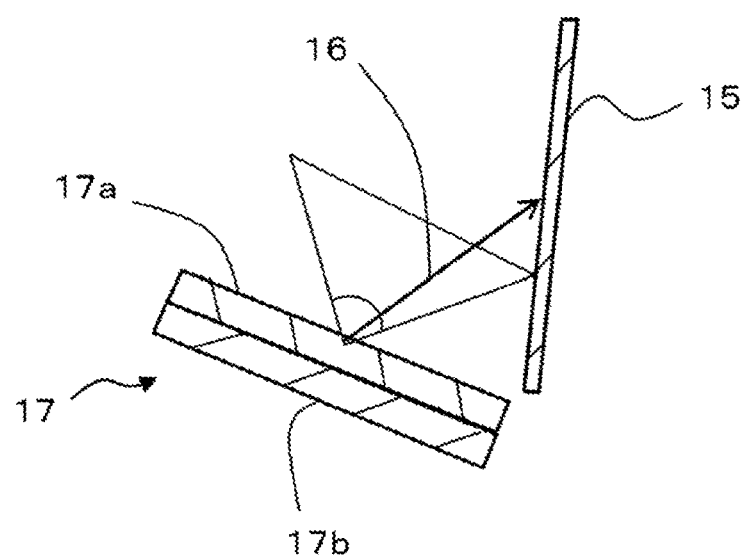
FIG. 3B is a view describing a converging angle adjustment range of a specific direction converging backlight of an image projection device.
Figure 4:
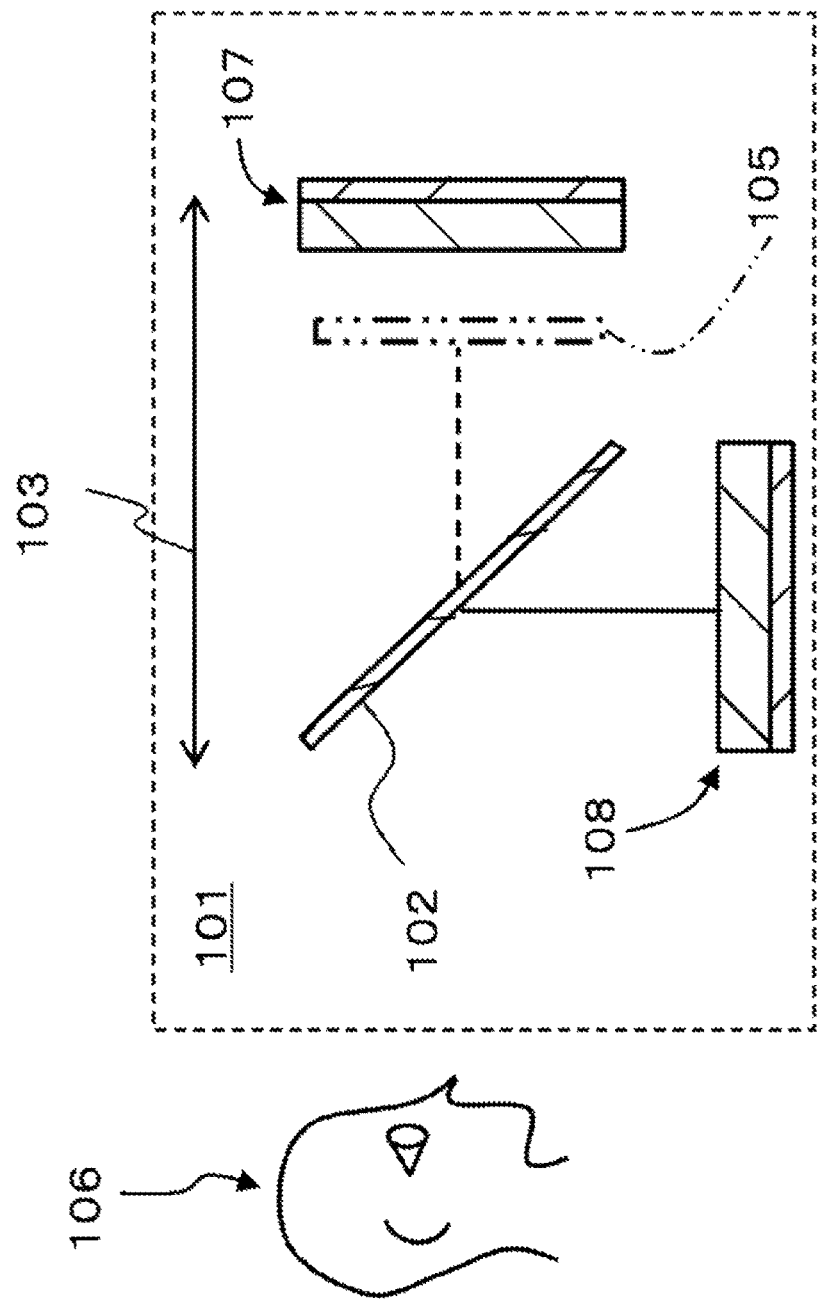
FIG. 4 is a schematic view of a conventional multilayer image display device using a half mirror.

An arrangement position of the lower side LCD 17 is determined in consideration of characteristics of the transparent screen 15 that a display image on the display screen 17a is totally reflected when the image is incident to the transparent screen 15 at a predetermined angle. A mutual arrangement position is determined such that incident light from a display image on the display screen 17a is totally reflected on the transparent screen 15 as illustrated in FIGS. 3A and 2, and a light beam after the total reflection efficiently passes through a hollow portion of the steering wheel 23. As illustrated in FIG. 2, indicated by a region 25 by total reflection at a center of the transparent film 15, visibility is improved by efficiently passing the light beam through the hollow portion of the steering wheel 23. This is because, in the case of a total reflection region 26a at an upper end portion of the transparent screen 15 and a total reflection region 26b at a lower end portion of the transparent screen 15, a light beam is blocked, for example, by the steering wheel peripheral frame 23a. Therefore, a light passing in the hollow portion of the steering wheel 23 is limited. Further, as illustrated in FIG. 3B, the specific direction converging-type backlight 17b has a limited converging angle. In consideration of this point, an arrangement relation between the lower side LCD 17 and the transparent film 15 is determined. For example, as illustrated in FIG. 2, the lower side LCD 17 is disposed at an angle with a high condensing efficiency such that the lower side LCD 17 does not enter in an effective visual field. According to the above arrangement position of the lower side LCD 17, a distance between the lower side LCD 17 and the transparent screen 15 is shortened. Therefore, if a luminance of a totally reflected light beam is sufficient, a conventional backlight can be used without using the specific direction converging-type backlight 17b.

In order to satisfy the above-described condition, the back side LCD 12 of the two-layer image display device 11, the transparent screen 15 including an anisotropic optical film, the lower side LCD 17, and the visor 18 are included in an instrument panel (not illustrated) while keeping a suitable arrangement relation as illustrated in FIG. 2. A display image of the display screen 12a of the back side LCD 12 passes through the transparent screen 15 and is visually recognized by the viewer (driver) 20. Further, when the lower side LCD 17 is set at a position where incident light to the transparent screen 15 is totally reflected in the region 25 in which light is totally reflected at a center of the transparent film 15, the display image on the display screen 17a is totally reflected by the transparent screen 15, passes through a hollow portion of the steering wheel 23, and is visually recognized by the viewer (driver) 20. Consequently, a display image of the back side LCD 12 and a display image of the lower side LCD 17 are superimposed, and a two-layer image display is realized.

According to the two-layer image display device (multi-layer image display device) 11 according to the embodiment, a device body is down-sized, a transparent light efficiency is increased, and a cluster panel with high visibility can be provided. Specifically, instead of a conventional half mirror inclined at 45 degrees, a transparent screen including an anisotropic optical film is used. Therefore, a mirror inclined at 45 degrees is not needed, and the depth length of a visor can be shortened. When the length of the visor is shortened, an outer diameter is reduced, and also a limitation on an upper visual field area is released. Further, a reflection image of a conventional half mirror type is a vertical image. Therefore, a size of the half mirror needs to be increased to correspond to a head movable range of a driver. In the embodiment described herein, a reflection image on a transparent screen is a real image, and visibility is not affected in a certain head-movable range. Furthermore, a transmittance of a display image of a back side LCD of the conventional half mirror type is approximately 50%.

However, a transmittance of a transparent screen according to the embodiment described herein is high (approximately 80%), and increasing a luminance of the back side LCD 12 is not needed.

An incident angle of a projection image from the lower side LCD 17 to the transparent screen 15 is set to a predetermined total reflection angle. Therefore, in the case where a luminance of a reflection image is insufficient, an insufficiency of a light flux can be addressed by using a specific direction converging-type backlight. Therefore, a cluster panel of the two-layer image display device according to the embodiment described herein can solve the above-described issues of a cluster panel of a conventional half mirror-type two-layer image display device. The back side LCD 12 and the lower side LCD 17 may be individually used without using both at the same time.

As described above, according to the present disclosure, in comparison with a multilayer image display device using a conventional inclined half mirror, the depth of a device body including a visor is shortened, and the device body is made compact. Further, a transparent film reflection image is a real image. Therefore, a visibility is not affected in a certain head-movable range of a viewer. Since a transmittance of the transparent film is high, a luminance of an image display device positioned on a lower side of a film does not need to be increased. Therefore, the multilayer image display device according to the present disclosure is effective.

What is claimed is:

1. A multilayer image display device, comprising; an image display device configured to display an image on a display screen; a transparent screen disposed on a front side of the display screen of the image display device; and an image projection device configured to project an image from a lower position below the transparent screen, wherein the transparent screen reflects, with directivity, light incident at a predetermined angle and includes an anisotropic optical film which transmits light incident at an angle other than the predetermined angle, wherein the image projection device is disposed at a position relative to the transparent screen where light of the projected image is incident at the predetermined angle and reflected on the transparent screen, and wherein the image display device is disposed at position relative to the transparent screen where light of the displayed image is incident at an angle other than the predetermined angle and transmitted through the transparent screen.

2. The multilayer image display device according to claim 1, wherein an orientation of the image projection device is selectively adjustable to adjust an angle incident to the transparent screen to the predetermined angle.

3. The multilayer image display device according to claim 1, wherein a light source of the image projection device is a specific direction converging light source which converges light in a specific direction.

4. The multilayer image display device according to claim 3, wherein the image projection device comprises a converging light angle adjustment unit configured to adjust a converging angle of the specific direction converging light source.

5. The multilayer image display device according to claim 1, wherein the image display device and the image projection device comprise an LCD panel which displays an image by using a backlight as a light source.

6. The multilayer image display device according to claim 1, wherein display screens of the image display device and the image projection device are AR coated screens.

* * * * *